US009397576B2

(12) United States Patent
Chen et al.

(10) Patent No.: US 9,397,576 B2
(45) Date of Patent: Jul. 19, 2016

(54) CONTROL CIRCUIT

(71) Applicant: NATIONAL TAIWAN UNIVERSITY, Taipei (TW)

(72) Inventors: Yaow-Ming Chen, Taipei (TW); Cheng-Nan Wu, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 100 days.

(21) Appl. No.: 14/503,417

(22) Filed: Oct. 1, 2014

(65) Prior Publication Data

US 2016/0006358 A1   Jan. 7, 2016

(30) Foreign Application Priority Data

Jul. 1, 2014 (TW) .............................. 103122674 A (51) Int. Cl.
*H02M 3/335* (2006.01)
*H02M 1/00* (2006.01)

(52) U.S. Cl.
CPC ...... *H02M 3/33507* (2013.01); *H02M 3/33523* (2013.01); *H02M 2001/0009* (2013.01); *H02M 2001/0025* (2013.01)

(58) Field of Classification Search
CPC ............. H02M 2001/0009; H02M 2001/0025; H02M 3/33507; H02M 3/33523; H01M 2/02; H01M 2/1235; H01M 2/1241; H01M 10/052
See application file for complete search history.

(56) References Cited

U.S. PATENT DOCUMENTS

| 5,245,526 | A  | * | 9/1993  | Balakrishnan | .......... | G05F 1/563 |
|           |    |   |         |              |            | 323/284    |
| 7,911,815 | B2 |   | 3/2011  | Wang et al.  |            |            |
| 8,018,741 | B2 |   | 9/2011  | Huynh et al. |            |            |
| 2010/0194463 | A1 | * | 8/2010 | Moon | ...................... | H02M 1/32 |
|           |    |   |         |              |            | 327/427    |
| 2012/0155121 | A1 | * | 6/2012 | Yao | .................... | H02M 3/33507 |
|           |    |   |         |              |            | 363/21.12  |
| 2013/0100711 | A1 | * | 4/2013 | Langeslag | ......... | H02M 3/33507 |
|           |    |   |         |              |            | 363/21.12  |
| 2013/0294118 | A1 | * | 11/2013 | So | ...................... | H02M 3/33507 |
|           |    |   |         |              |            | 363/21.16  |

FOREIGN PATENT DOCUMENTS

TW           I430554 B       3/2014

* cited by examiner

*Primary Examiner* — Emily P Pham
*Assistant Examiner* — Demetries A Gibson
(74) *Attorney, Agent, or Firm* — CKC & Partners Co., Ltd.

(57) ABSTRACT

A control circuit is adapted for controlling a converter. The converter includes a transformer and a power switch. The control circuit includes a current sensing unit, a current emulating unit, and a control unit. The current sensing unit senses a current flowing through the power switch coupled to a primary winding of the transformer. The current emulating unit determines a propagation delay period according to a voltage transient time of an auxiliary winding of the transformer and a turn-off time of the power switch, and retrieves several sampling times in a conduction period of the power switch according to the propagation delay period. The current emulating unit obtains a peak current and a valley current according to the sampling voltages corresponding to the sampling times. The control unit generates a control signal configured to control the power switch according to the peak current and the valley current.

13 Claims, 10 Drawing Sheets

CONTROL CIRCUIT

RELATED APPLICATIONS

This application claims priority to Taiwanese Application Serial Number 103122674, filed Jul. 1, 2014, the entirety of which is herein incorporated by reference.

BACKGROUND

1. Technical Field

The present disclosure relates to a control circuit. More particularly, the present disclosure relates to a control circuit for controlling a constant output current of a converter.

2. Description of Related Art

A primary side regulator (PSR) can control an output current of a power converter. Specifically, the power converter includes a transformer. The conventional control approach for the primary side regulator is to control a conduction period of a power switch connected to a primary winding of the transformer so as to control an inductor current of the power converter. Accordingly, a constant output current of the power converter is achieved. Since the primary side regulator does not control the converter according to a feedback current from a secondary winding of the transformer, the circuitry of the primary side regulator is simple and the routing cost of the primary side regulator is low. However, the conventional primary side regulator has a defect. When the power switch is cut off, an error in the inductor current is occurred because of the effect of the propagation delay of the circuitry in the power converter, which results in an inaccurate cut-off point of the power switch and a variation in the output voltage and current. Accordingly, line regulation of the power converter is degraded.

Figure 1:
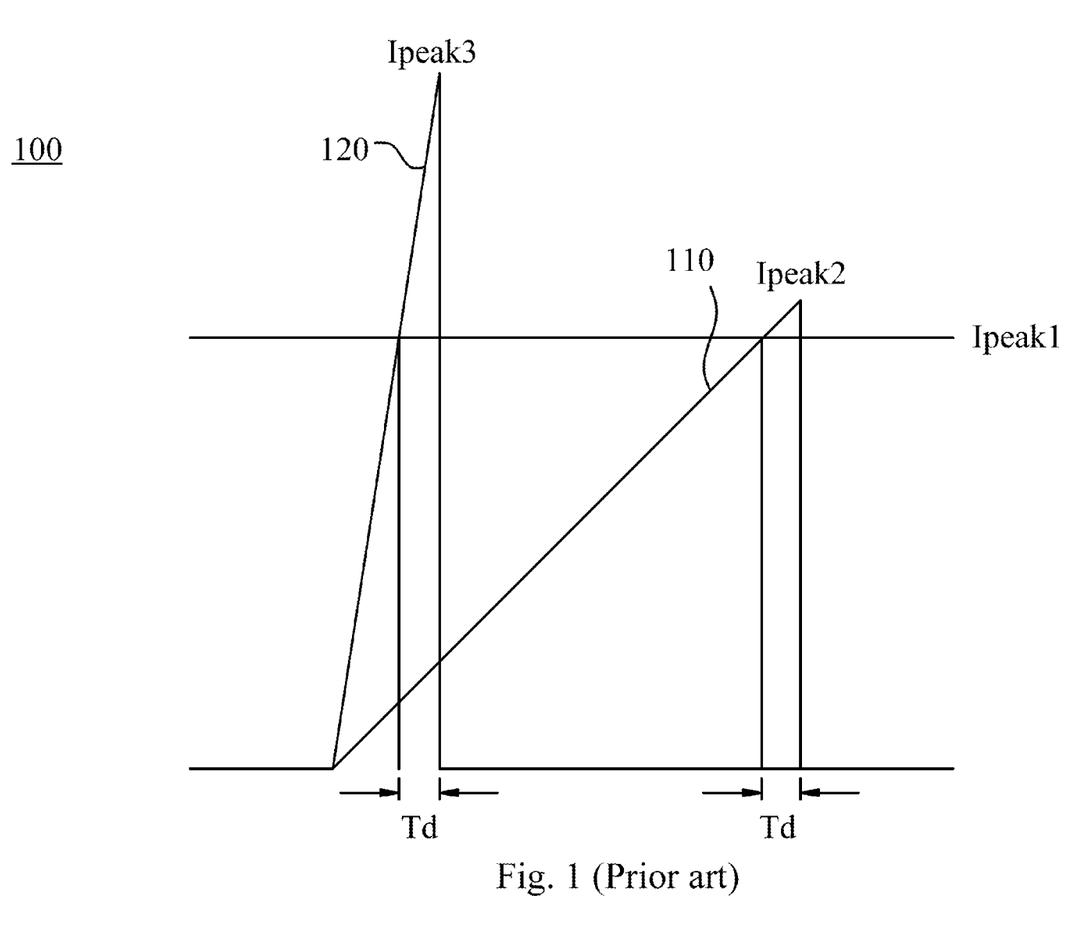
FIG. 1 depicts a waveform diagram of inductor currents of a prior art primary side regulator.

As shown in FIG. 1, in a waveform 110 of an inductor current, the peak value of the inductor current is viewed as Ipeak1. However, because of the effect of the propagation delay Td of the circuitry, the actual peak value of the wave 110 of the inductor current should be Ipeak2. Furthermore, when the input voltage increases or a tolerance of the inductance is occurred, waveform of the inductor current is changed to a waveform 120, and thus the actual peak value of the inductor current is changed from Ipeak1 to Ipeak3. In other words, an error amount of the inductor current is increased along with the increased output voltage. In each of the waveform 110 and the waveform 120, an error caused by the propagation delay Td results in variation of the output current and degradation of the line regulation. The conventional approach is to add a saw-limit compensation circuit for correcting an error of the output current. However, in this way, the tolerance of the output current of the power converter still fails to be corrected effectively and precisely.

SUMMARY

In order to solve aforementioned problems, the present disclosure is to provide a control circuit for controlling an input power or an output current of a converter. The converter includes a transformer and a power switch. A peak current and a valley current of a primary winding of a converter are obtained by calculating several sampling voltages, in which the sampling voltages are obtained at several sampling times in a conduction period of the power switch. Next, the power switch is controlled according to the peak current and the valley current so as to control the input power and the output current of the converter.

One aspect of the present disclosure is to provide a control circuit. The control circuit is adapted for controlling an input power or an output current of a converter. The converter includes a transformer and a power switch. The power switch is electrically coupled to a primary winding of the transformer. The control circuit includes a current sensing unit, a current emulating unit, and a control unit. The current sensing unit is electrically coupled to the power switch. The current sensing unit is configured to sense a current flowing through the power switch, and to convert the current into a voltage. The current emulating unit is electrically coupled to an auxiliary winding of the transformer, the power switch, and the current sensing unit. The current emulating unit is configured to determine a propagation delay period according to a voltage transient time of the auxiliary winding and a turn-off time of the power switch, and to retrieve several sampling times in a conduction period of the power switch according to the propagation delay period. The current emulating unit is configured to obtain several sampling voltages corresponding to the sampling times by the current sensing unit, and to obtain a peak current and a valley current flowing through the power switch according to the sampling voltages. The control unit is configured to generate a control signal according to the peak current and the valley current. The control signal is configured to control the power switch so as to control the input power or the output current of the converter.

According to one embodiment of the present disclosure, the sampling times includes a first sampling time, a second sampling time, and a third sampling time. A time interval between the first sampling time and the second sampling time is substantially equal to the propagation delay period. The third sampling time is the turn-off time of the power switch.

According to one embodiment of the present disclosure, the current emulating unit is configured to subtract a first sampling voltage corresponding to the first sampling time from a sum of a second sampling voltage corresponding to the second sampling time and a third sampling voltage corresponding to the third sampling time so as to obtain a peak voltage corresponding to the peak current.

According to one embodiment of the present disclosure, the sampling times further includes a fourth sampling time. A time interval between the fourth sampling time and the first sampling time is substantially equal to a time interval between the first sampling time and a conduction time of the power switch.

According to one embodiment of the present disclosure, the current emulating unit is configured to subtract a fourth sampling voltage corresponding to the fourth sampling time from two times of the first sampling voltage so as to obtain a valley voltage correspond to the valley current.

According to one embodiment of the present disclosure, the control circuit further includes a lead edge blanking unit electrically coupled to the current sensing unit and the current emulating unit. The lead edge blanking unit is configured to delay the current emulating unit for a blanking period when the power switch is conducted.

According to one embodiment of the present disclosure, the time interval between the fourth sampling time and the first sampling time, the time interval between the first sampling time and the conduction time of the power switch, and the blanking period are substantially the same.

According to one embodiment of the present disclosure, the current emulating unit includes a sample and hold circuit and a current calculating circuit. The sample and hold circuit is configured to sample the sampling voltages at the sampling times. The current calculating circuit is configured to receive and calculate the sampling voltages so as to obtain the peak current and the valley current.

According to one embodiment of the present disclosure, the current calculating circuit includes a current mirror and an analog adder/subtractor. The current mirror is configured to convert the sampling voltage into a plurality of sampling currents. The analog adder/subtractor is configured to calculate the sampling currents so as to obtain the peak current and the valley current.

According to one embodiment of the present disclosure, the current calculating circuit includes an analog-to-digital converter, a digital adder/subtractor, and a digital-to-analog converter. The analog-to-digital converter is configured to receive the sampling voltages, and to convert the sampling voltages into several digital codes. The digital adder/subtractor is configured to receive and calculate the digital codes, and to generate a digital signal. The digital-to-analog converter is configured to receive the digital signal, and to convert the digital signal into the peak current and the valley current.

According to one embodiment of the present disclosure, the control unit includes an integrator unit and an error amplifier unit. The integrator unit electrically coupled to the current emulating unit. The integrator circuit is configured to integrate the peak current and the valley current so as to obtain an emulated voltage. The error amplifier unit is configured to compare the emulated voltage with a reference voltage so as to generate an error signal. The control unit generates the control signal according to the error signal.

According to one embodiment of the present disclosure, the control unit further includes a conduction time control unit, a zero current detection unit, and a flip-flop unit. The conduction time control unit is electrically coupled to the error amplifier unit. The conduction time control unit is configured to generate the control signal according to the error signal. The zero current detection unit is electrically coupled to the auxiliary winding. The zero current detection unit is configured to generate an enable signal according to the voltage transient time of the auxiliary winding. The flip-flop unit is configured to determine whether to output the control signal to the power switch according to the enable signal.

According to one embodiment of the present disclosure, the control unit further includes a comparison unit and a flip-flop unit. The comparison unit is configured to compare a current signal sensed by the current sensing unit with the error signal so as to generate the control signal. The flip-flop unit is configured to determine to whether to output the control signal to the power switch according to an oscillation signal.

According to one embodiment of the present disclosure, the control unit includes an integrator unit, a first error amplifier unit, a second error amplifier unit, a selection unit, a comparison unit, and a flip-flop unit. The integrator unit is electrically coupled to the current emulating unit. The integrator circuit is configured to integrate the peak current and the valley current so as to obtain an emulated voltage. The first error amplifier unit is configured to compare the emulated voltage with a first reference voltage so as to generate a first error signal. The second error amplifier unit is configured to compare a voltage of the auxiliary winding with a second reference voltage so as to generate a second error signal. The selection unit is configured to output corresponding one of the first error signal and the second error signal. The comparison unit is configured to compare a current signal sensed by the current sensing unit with the corresponding one of the first error signal and the second error signal so as to generate the control signal. The flip-flop unit is configured to determine to output the control signal to the power switch according to an oscillation signal.

To sum up, the present disclosure provides a control circuit, which can correct an error in an inductor current caused by a propagation delay period of the converter of the circuitry, such that line regulation of the circuitry is improved.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 2:
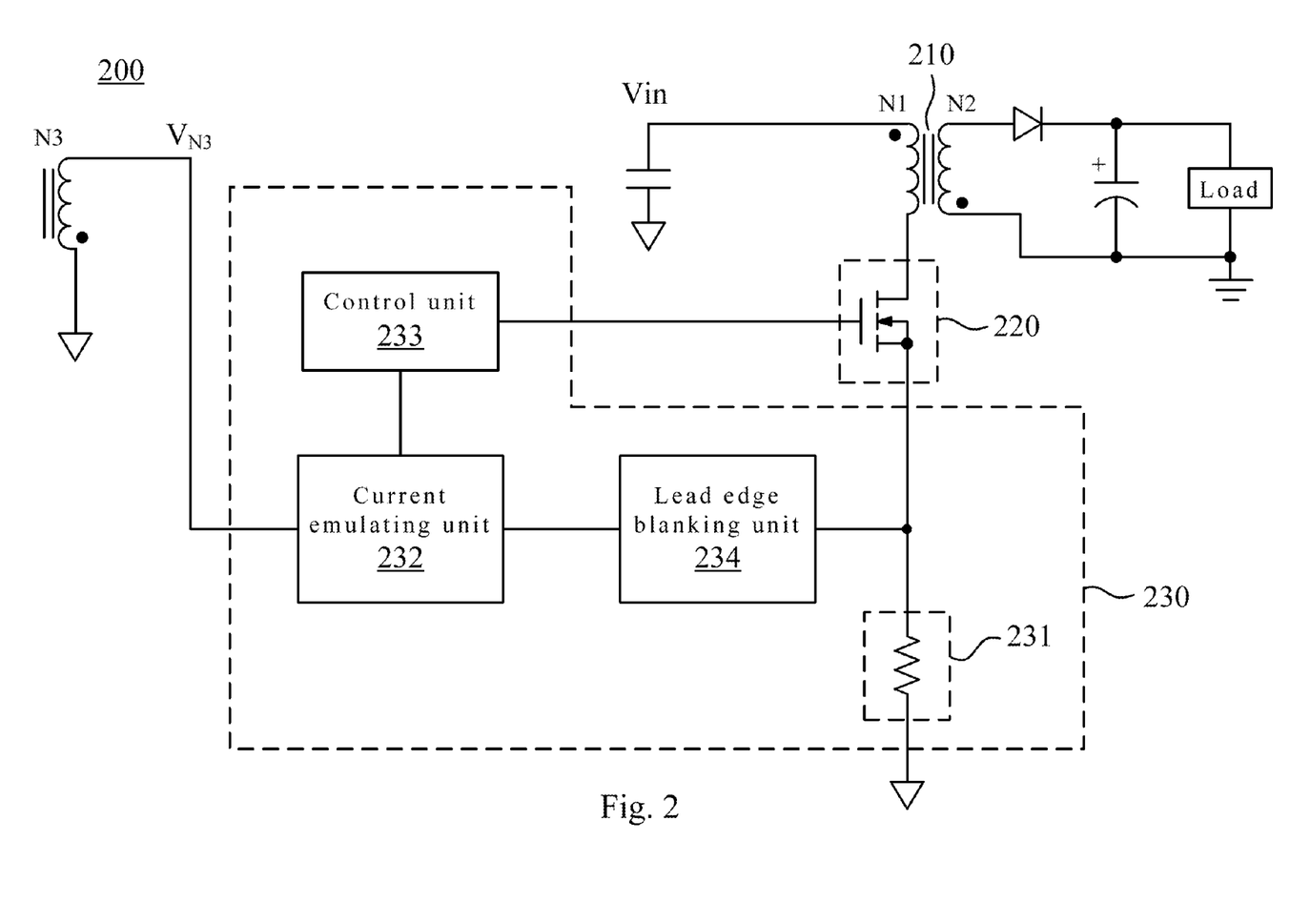
FIG. 2 depicts a schematic diagram of a converter according to a first embodiment of the present disclosure.

FIG. 2 depicts a schematic diagram of a converter 200 according to a first embodiment of the present disclosure. As shown in FIG. 2, the converter 200 includes a transformer 210, a power switch 220, and a control circuit 230. The converter 200 receives an input voltage Vin through a primary winding N1 of the transformer 210, and a first current is formed on the primary winding N1. A second current is induced on a secondary winding N2 of the transformer 210 according to a variation of the first current. The second current is provided to a load electrically coupled to the secondary winding N2 of the transformer 210. The power switch 220 is electrically coupled to the primary winding N1 of the transformer 210. The control circuit 230 can control a conduction period or an operating frequency of power switch 220 so as to control an output of the converter 200. In other words, the control circuit 230 is configured to control an energy provided to the load by controlling the power switch 220 coupled to the primary winding N1 of the transformer 210.

The control circuit includes a current sensing unit 231, a current emulating unit 232, and a control unit 233. The current sensing unit 231 is electrically coupled to the power switch 220. The current sensing unit 231 is configured to sense a current flowing through the power switch 220, and to convert the current into a voltage. In one embodiment, the current sensing unit 231 may include a sensing resistance.

The current emulating unit 232 is electrically coupled to an auxiliary winding N3 of the transformer 210, the power switch 220, and the current sensing unit 231. The current emulating unit 232 is configured to determine a propagation delay period according to a voltage $V_{N3}$ transient time of the auxiliary winding N3 and a turn-off time of the power switch 220. Moreover, the current emulating unit 232 is further configured to retrieve several sampling times in a conduction period of the power switch 220 according to the propagation delay period, and to obtain several sampling voltages at the sampling times by the current sensing unit 231. The current emulating unit 232 may obtain a peak current and a valley current flowing through the power switch 220 according to the sampling voltages.

The control unit 233 is configured to generate a control signal according to the peak current and the valley current. The control signal is configured to control the power switch 220 so as to control an output current (e.g., the second current) of the converter 200. In one embodiment, the control signal is configured to control a conduction period or an operating frequency of the power switch 220, such that the converter 200 can output a constant current.

Figure 3:
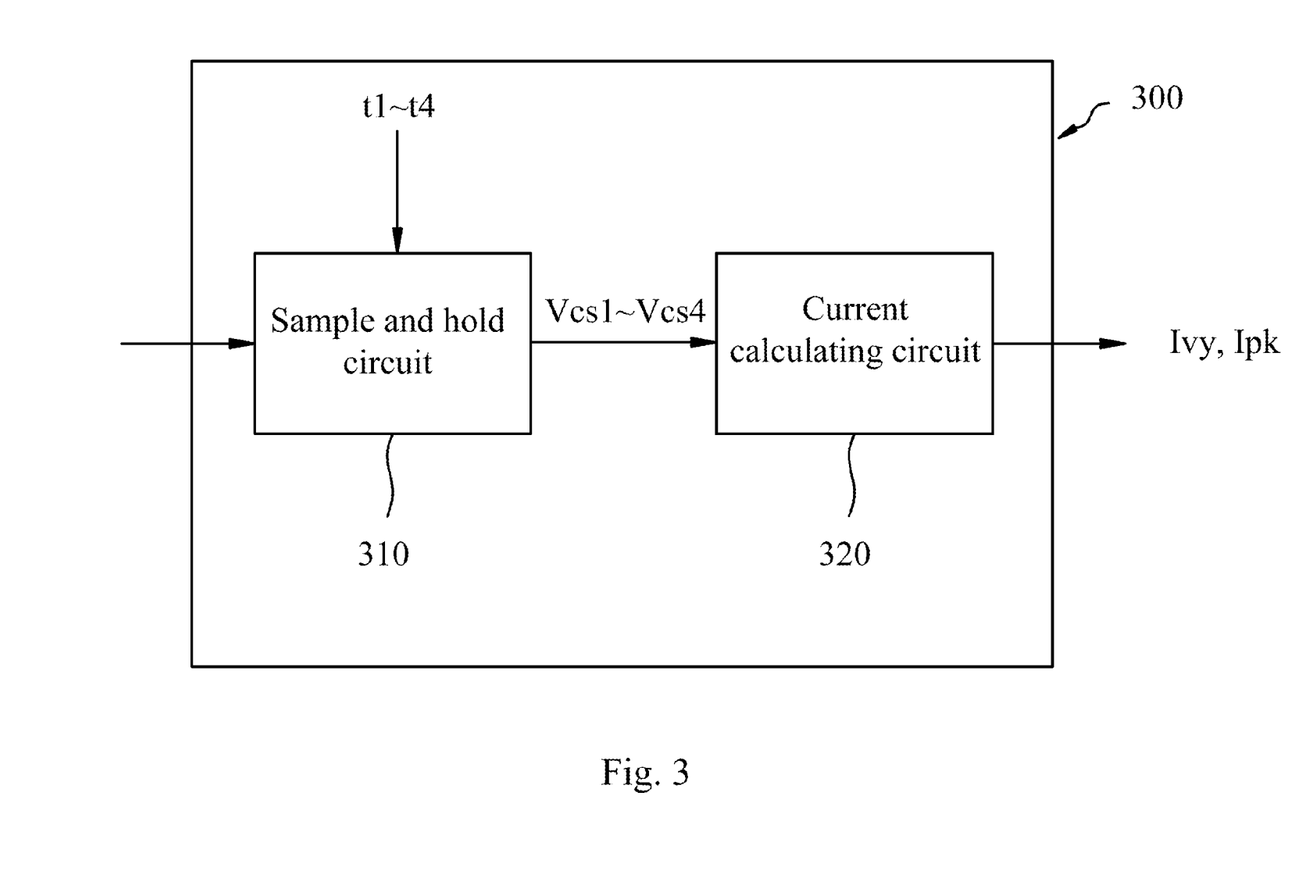
FIG. 3 depicts a schematic diagram of a current emulating unit according to one embodiment of the present disclosure.

FIG. 3 depicts a schematic diagram of a current emulating unit 300 according to one embodiment of the present disclosure. The current emulating unit 300 can be applied in the control circuit 230 of FIG. 2, but the present disclosure is not limited in this regard. As shown in FIG. 3, the current emulating unit 300 includes a sample and hold circuit 310 and a current calculating circuit 320. The sample and hold circuit 310 is electrically coupled to the current sensing unit (not shown in the figure). The sample and hold circuit 310 is configured to obtain several sampling voltages Vcs1-Vcs4 corresponding to several currents flowing through the power switch (not shown in the figure) at several sampling times t1-t4, in which the currents are sensed by the current sensing unit. The current calculating circuit 320 is configured to receive and calculate the sampling voltages Vcs1-Vcs4 so as to obtain values of a valley current Ivy and a peak current Ipk. Therefore, by performing aforementioned sampling operations with the sample and hold circuit 310, and by calculating the actual valley current Ivy and the actual peak current Ipk with the current calculating circuit 320, variations in the output current can be improved.

Figure 4:
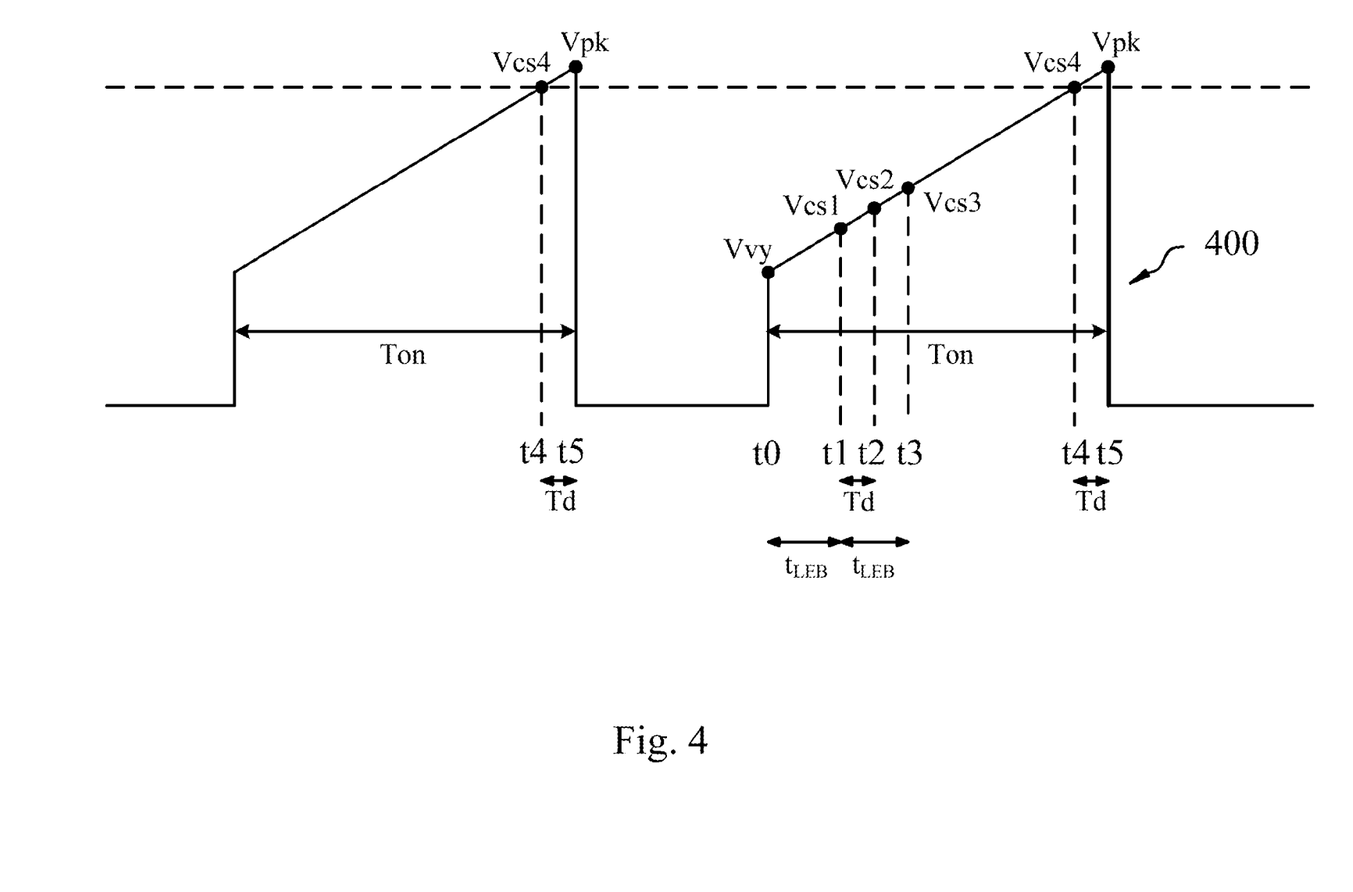
FIG. 4 depicts a timing diagram of sampling times according to one embodiment of the present disclosure.

Reference is made to FIG. 2, FIG. 3, and FIG. 4. FIG. 4 depicts a timing diagram of sampling times according to one embodiment of the present disclosure. As shown in FIG. 4, in the timing diagram of sampling times as they related to an inductor current 400, the current emulating unit 232 may retrieve sampling times t1-t4 in a conduction period Ton of the power switch 220. In one embodiment, a sampling time t4 is a turn-off time of the power switch 220. The current emulating unit 232 may obtain sampling voltages Vcs1-Vcs4 at the sampling times t1-t4.

In one embodiment, the actual peak current is occurred in a peak time t5. Since the peak time t5 is a time after the power switch 220 is cut off, the actual peak voltage Vpk corresponding to the peak current at the time t5 is unable to be directly obtained with respect to the timing diagram of actual circuitry.

Since when current is conducted on the secondary winding N2 of the transformer 210 (i.e., when a value of an inductor current of the secondary winding N2 is substantially equal to a value of the peak current), a voltage transient is occurred on the auxiliary winding N3 of the transformer 230, too. Accordingly, the current emulating unit 232 may determine a time when a value of the inductor current of the secondary winding N2 is substantially equal to a value of the peak current, that is, the peak time t5, by sensing a voltage transient time of the auxiliary winding N3. Moreover, the current emulating unit 232 may further determine a propagation delay period Td by sensing a time when the power switch is cut off, that is, the sampling time t4. Specifically, the propagation delay period Td is substantially equal to a time interval between the peak time t5 and the sampling time t4. Accordingly, the current emulating unit 232 may obtain the propagation delay period Td from a previous conduction period Ton of the power switch 220 by aforementioned operations, and may retrieve the sampling times t1-t4 in the present conduction period Ton of the power switch 220 according to the propagation delay period Td.

In one embodiment, a time interval between the sampling time t2 and the sampling time t1 is substantially equal to the propagation delay period Td. Accordingly, the current emulating unit 232 may subtract the sampling voltage Vcs1 from the sum of the sampling voltage Vcs4 and the sampling voltage Vcs2 so as to obtain the actual peak voltage Vpk, and obtain the actual peak current Ipk according to the peak voltage Vpk. Therefore, the actual valley voltage Vvy and the actual peak voltage Vpk can be calculated by the aforementioned operations according to the linearity of the inductor current, such that the error in output current can be improved according to the valley voltage Vvy and the peak voltage.

In one embodiment, the converter 200 of FIG. 2 can be operated in hybrid mode. In other words, the converter 200 can be operated in continuous conduction mode (CCM) or discontinuous conduction mode (DCM). Generally, the user must determine whether a valley current flowing through the power switch (or a valley voltage sensed by the sensing resistance) is zero when the power switch is conducted so as to realize that the converter is operated in continuous conduction mode or discontinuous conduction mode. However, in actual circuitry, the precise initial voltage fails to be directly measured because of the fact that the sampling voltage measured at the time when the power switch 320 is conducted is usually accompanied with spikes and ringing, which distorts the sampling voltage.

Accordingly, in one embodiment, the control circuit 230 further includes a lead edge blanking unit 234. The lead edge blanking unit 234 is electrically coupled to the current sensing unit 231 and the current emulating unit 232. The lead edge blanking unit 234 is configured to delay the current emulating unit 232 for a blanking period $t_{LEB}$ when the power switch 220 is conducted. In other words, when the power switch 200 is conducted, the current emulating unit 232 retrieves the sampling voltages Vcs1-Vcs4 at the sampling times t1-t4 after the blanking period $t_{LEB}$.

In one embodiment, a time interval between the sampling time t3 and the sampling time t1, a time interval between the sampling time t1 and a conduction time of the power switch 220 (i.e., an initial time t0), and the blanking period $t_{LEB}$ are substantially the same, that is, $t_{LEB}$=t3−t1=t1−t0.

Therefore, according to the aforementioned configuration of the sampling times, the current emulating unit 232 may subtract the sampling voltage Vcs3 from the two times of the sampling voltage Vcs1 so as to obtain the valley voltage Vvy. Next, the current emulating unit 232 can determine an operation mode of the converter 200 according to a value of the valley voltage Vvy. When the valley voltage Vvy is substantially larger than zero, the current emulating unit 232 determines that the converter 200 is operated in continuous conduction mode. When the valley voltage Vvy is substantially equal to zero, the current emulating unit 232 determines that the converter 200 is operated in discontinuous conduction mode. Therefore, the correct valley voltage Vvy can be obtained according to the linearity of the inductor current and configuration of sampling times, and the operation mode of the converter 200 can be correctly determined by a value of the valley voltage Vvy.

Moreover, the current emulating unit 232 further obtains the actual valley current Ivy according to the valley voltage Vvy. Therefore, the actual valley voltage Vvy and the actual peak voltage Vpk can be calculated by the aforementioned operations according to the linearity of the inductor current. Accordingly, the corresponding valley current Ivy and the corresponding peak current Ipk can be obtained, thereby the tolerance in output current of the converter 200 can be improved.

Figure 5:
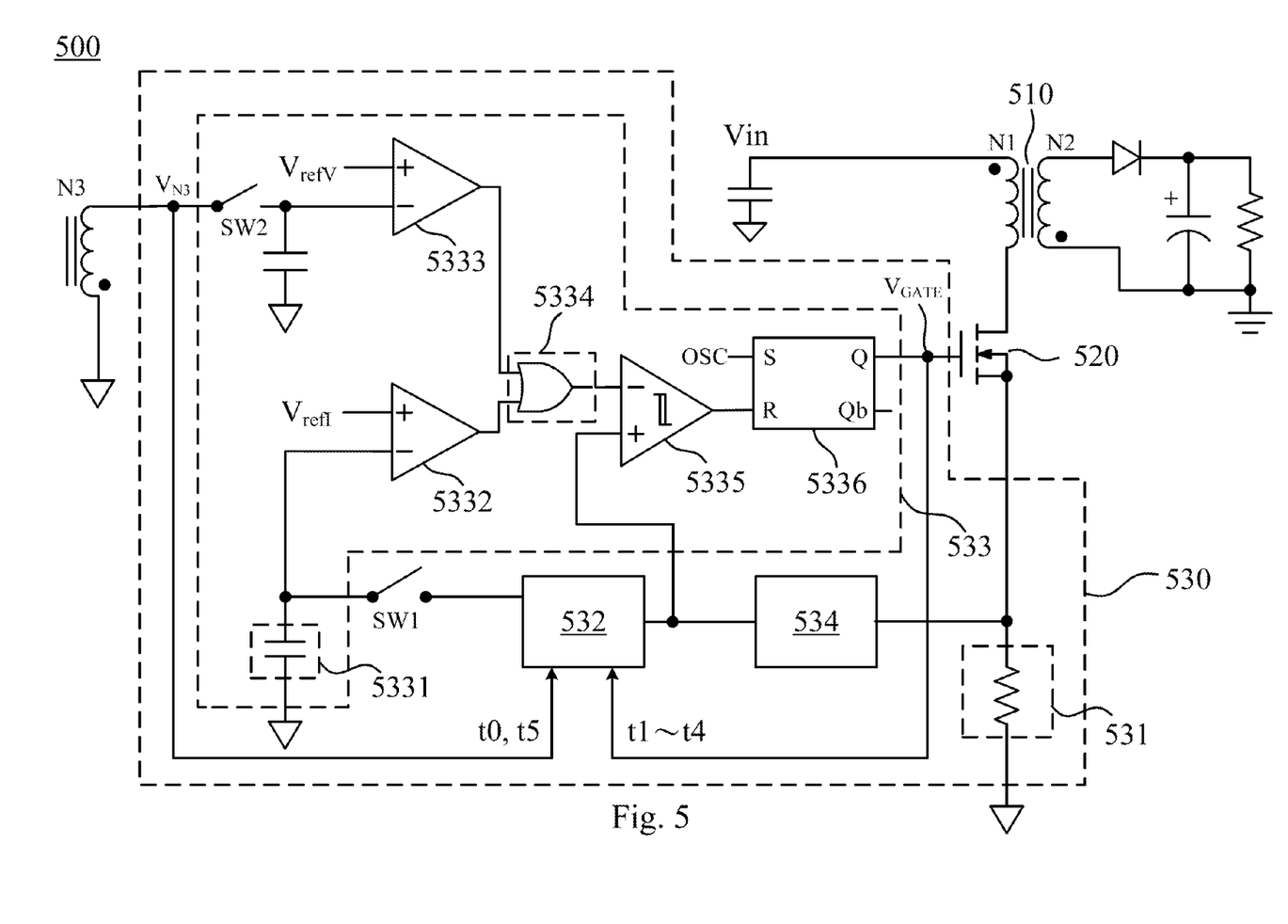
FIG. 5 depicts a schematic diagram of a converter according to a second embodiment of the present disclosure.

FIG. 5 depicts a schematic diagram of a converter 500 according to a second embodiment of the present disclosure. As shown in FIG. 5, the converter 500 includes a transformer 510, a power switch 520, and the control circuit 530. The control circuit 530 includes a current sensing unit 531, a current emulating unit 532, a control unit 533, and a lead edge blanking unit 534. Operations and connections of the current sensing unit 531, the current emulating unit 532, the control unit 533, and the lead edge blanking unit 534 are similar to those of the current sensing unit 231, the current emulating unit 232, the control unit 233, and the lead edge blanking unit 234 of FIG. 2, and thus they are not further detailed herein. In the present embodiment, the control unit 533 includes an integrator unit 5331, a first error amplifier unit 5332, a second error amplifier 5333, a selection unit 5334, a comparison unit 5335, and a flip-flop unit 5336.

The integrator unit 5331 is electrically coupled to the current emulating unit 532 through a switch SW1, and is configured to integrate the valley current and the peak current so as to obtain an emulated voltage. In one embodiment, the integrator unit 5331 includes a capacitor, but the present embodiment is not limited in this regard.

A first terminal of the first error amplifier unit 5332 is configured to receive a reference voltage $V_{refI}$. A second terminal of the first error amplifier unit 5332 is electrically coupled to the integrator unit 5331, and is configured to receive the emulated voltage. The first error amplifier unit 5332 is configured to compare the emulated voltage with the reference voltage $V_{refI}$ so as to generate a first error signal. An output terminal of the first error amplifier unit 5332 is configured to output the first error signal.

A first terminal of the second error amplifier unit 5333 is configured to receive a reference voltage $V_{refV}$. A second terminal of the second error amplifier unit 5333 is electrically coupled to an auxiliary winding N3 of the transformer 510 through a switch SW2, and is configured to receive a voltage $V_{N3}$ of the auxiliary winding N3. The second error amplifier unit 5333 is configured to compare the voltage $V_{N3}$ of the auxiliary winding N3 with the reference voltage $V_{refV}$ so as to generate a second error signal. An output terminal of the second error amplifier unit 5333 is configured to output the second error signal. In one embodiment, a turn-off period of the switch SW1 and the switch SW2 is substantially equal to a discharging period of a secondary winding N2 of the transformer 510.

A first terminal of the selection unit 5334 is electrically coupled to the output terminal of the first error amplifier unit 5332. A second terminal of the selection unit 5334 is electrically coupled to the output terminal of the second error amplifier unit 5333. An output terminal of the selection unit 5334 is electrically coupled to a first terminal of the comparison unit 5335. The output terminal of the selection unit 5334 is configured to output corresponding one of the first error signal and the second error signal to the comparison unit 5335. In one embodiment, the selection unit 5534 includes an OR gate, but the present disclosure is not limited in this regard.

A second terminal of the comparison unit 5335 is electrically coupled to the current sensing unit 531 through the lead edge blanking unit 534. Accordingly, the converter 500 can be operated in current mode, such that the converter 500 can achieve faster output response. The comparison unit 5335 is configured to compare the corresponding one of the first error signal and the second error signal with a current signal sensed by the current sensing unit 531 so as to generate a control signal. An output terminal of the comparison unit 5335 is configured to output the control signal.

A first terminal of the flip-flop unit 5336 is configured to receive an oscillation signal OSC. A second terminal of the flip-flop unit 5336 is electrically coupled to the output terminal of the comparison unit 5335. An output terminal of the flip-flop unit 5336 is electrically coupled to a control terminal of the power switch 520. The flip-flop unit 5336 is configured to determine whether to output the control signal to the power switch 520 according to the oscillation signal OSC. In one embodiment, the flip-flop unit 5336 includes a RS flip-flop, but the present disclosure is not limited in this regard. In the present embodiment, the control signal is configured to control a conduction period of the power switch unit 520 so as to control the converter 500 to output a constant voltage and a constant current.

Figure 6:
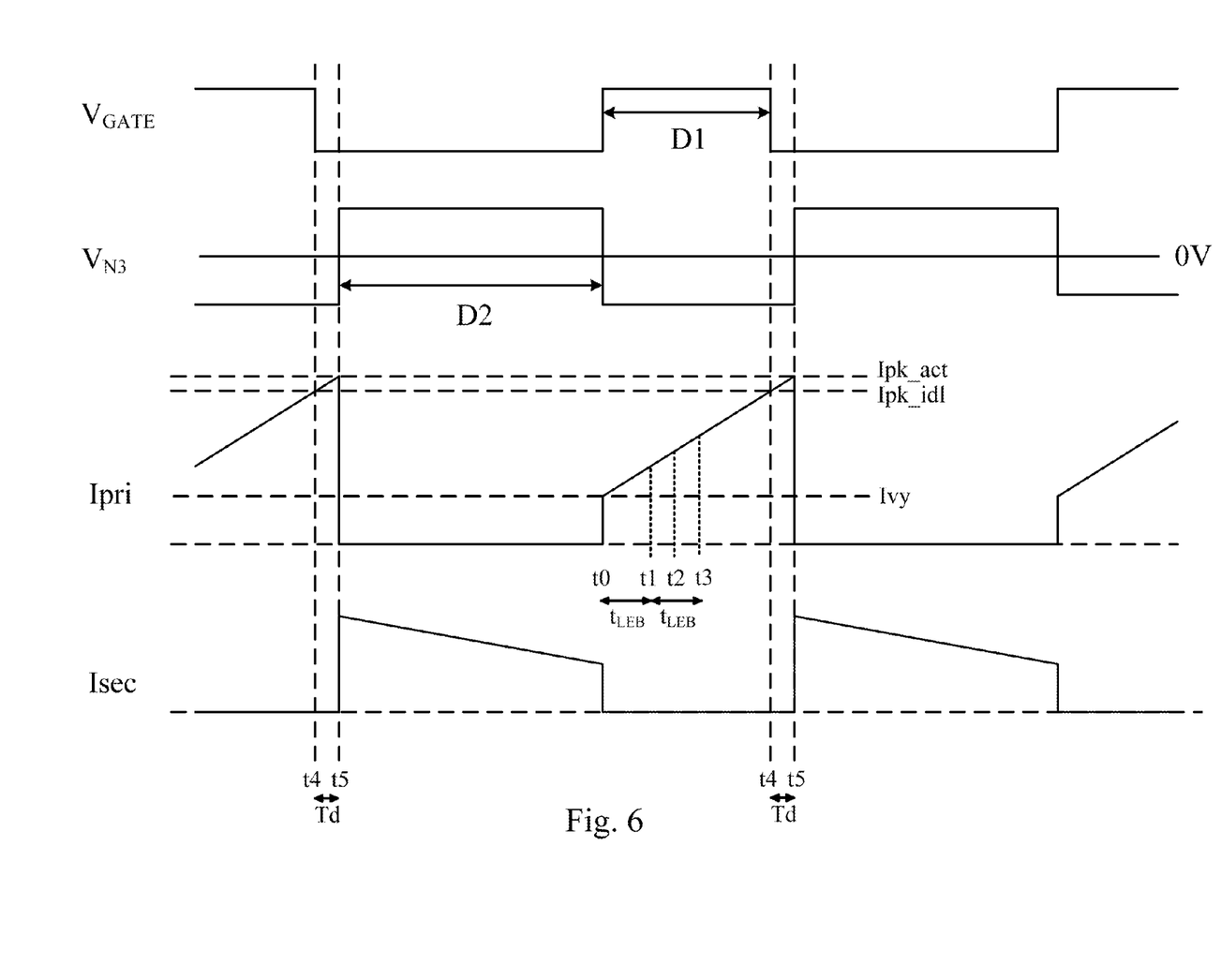
FIG. 6 depicts a timing diagram according to one embodiment of the present disclosure.

Reference is made to FIG. 5 and FIG. 6. FIG. 6 depicts a timing diagram according to one embodiment of the present disclosure. As shown in FIG. 6, the primary winding N1 of the transformer 510 begins to generate a current Ipri according to the input voltage Vin during a conduction period D1 of the power switch 520. In ideal condition, when the power switch 520 is cut off, the secondary winding N2 of the transformer 510 should generate an output current Isec to the load according to an ideal peak current Ipk_idl. However, because of the propagation delay period Td of the converter 500, the secondary winding N2 of the converter 500 actually generates the output current Isec according to a peak current Ipk_act, such that an error is occurred in the output current Isec provided to the load. Accordingly, in order to obtain the actual peak current so as to improve the tolerance in the output current, one may obtain the sampling voltages at the aforementioned sampling times t1-t4 by the current emulating unit 532, and calculate the sampling voltages so as to obtain the actual peak current and the actual valley current (e.g., the peak current Ipk_act). The sampling and calculating operations are similar to the aforementioned embodiments, and thus they are not further detailed herein.

After the actual peak current and the actual valley current are obtained, an average output current provided to the load can be further obtained. In one embodiment, average output current Iavg can be obtained by a formula:

$$Iavg = \frac{n_{21}D_2}{2} \times (Ipk\_act + Iini),$$

in which $n_{21}$ represents a turns ratio of a secondary winding N2 to a primary winding N1, D2 represents a discharging period of the secondary winding N2, Ipk_act represents a peak current of the primary winding N1, Ivy represents a valley current of the primary winding N1. Moreover, the peak current can be obtained by subtracting a current sensed at the sampling time t1 from the sum of a current sensed at the sampling time t4 and a current sensed at the sampling time t2. The valley current can be obtained by subtracting a current sensed at the sampling time t3 from two times of a current sensed at the sampling time t1. Moreover, a time interval between the sampling time t2 and the sampling time t1 is substantially equal to a propagation delay period Td of the converter 500. Additionally, a time interval between the sampling time t3 and the sampling time t1, a time interval between the sampling time t1 and a conduction time of the power switch 520, and the blanking period $t_{LEB}$ are substantially the same.

Similarly, after the valley current Ivy is obtained, the current emulating unit 532 can determine an operation mode of the converter 500 according to a value of the valley current Ivy. When the valley current Ivy is substantially larger than zero, the current emulating unit 532 determines that the converter 500 is operated in continuous conduction mode. When the valley current is substantially equal to zero, the current emulating unit 532 determines that the converter 500 is operated in discontinuous conduction mode. It is noted that the actual peak current and the actual valley current are obtained by calculating the sampling currents in the present disclosure, but the sampling currents may be obtained from sampling the sampling voltages.

By aforementioned embodiments, not only can a constant output current of the converter be achieved, but also a constant input power can be achieved by changing a conduction time of the switch SW1. Specifically, charge amount is equal to current multiplied by time, and power is equal to electrical energy (i.e., charge amount multiplied by voltage) per time. Accordingly, by aforementioned embodiments, charge amount of the primary winding can be controlled in a constant value (i.e., the current is controlled in a constant value), such that the constant input power of the converter can be achieve.

Figure 7:
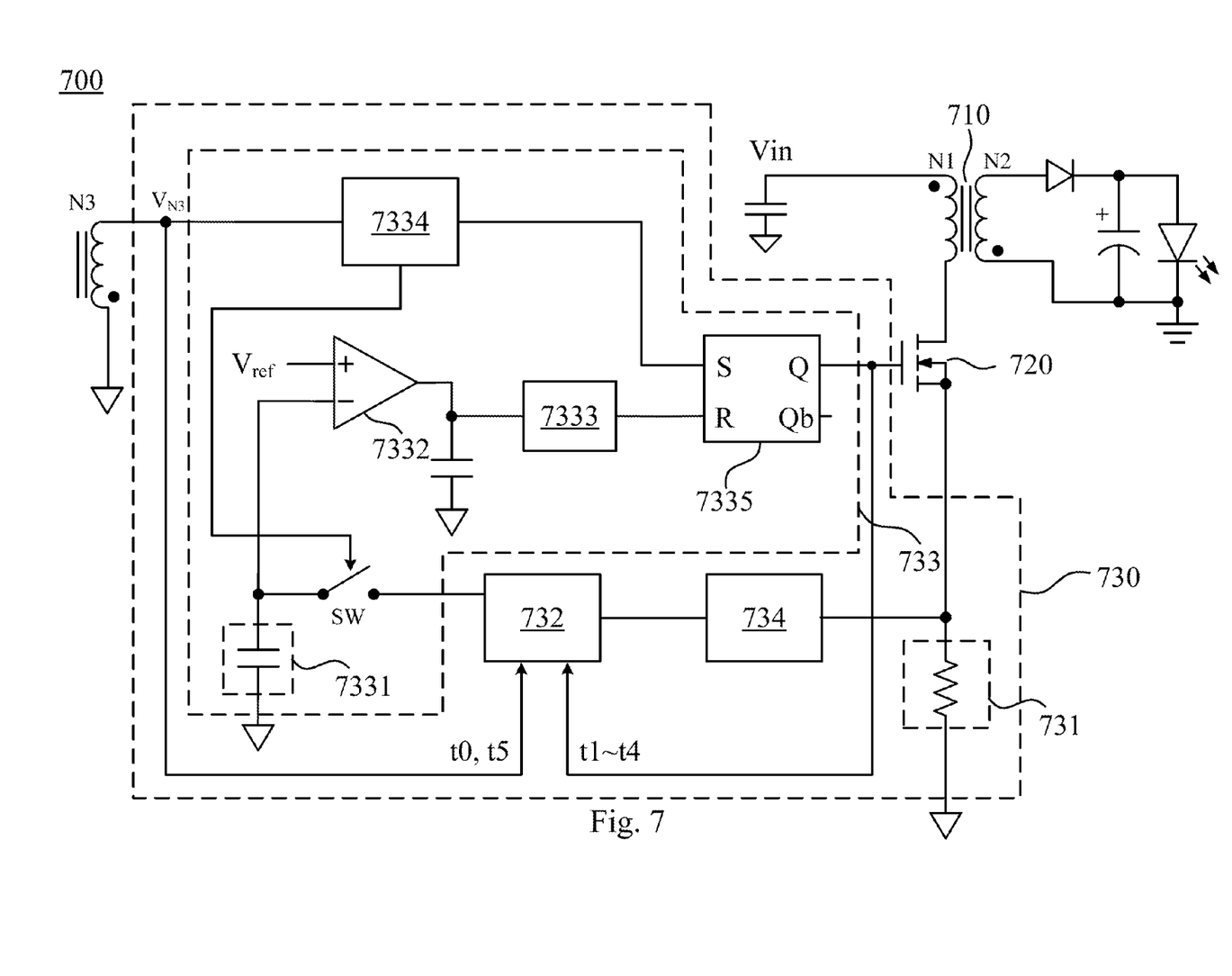
FIG. 7 depicts a schematic diagram of a converter according to a third embodiment of the present disclosure.

FIG. 7 depicts a schematic diagram of a converter 700 according to a third embodiment of the present disclosure. The converter 700 is adapted for driving an LED load. The converter 700 includes a transformer 710, a power switch 720, and a control circuit 730. The control circuit 730 includes a current sensing unit 731, a current emulating unit 732, a control unit 733, and a lead edge blanking unit 734. Operations and connections of the current sensing unit 731, the current emulating unit 732, the control unit 733, and the lead edge blanking unit 734 are similar to those of the current sensing unit 531, the current emulating unit 532, the control unit 533, and the lead edge blanking unit 534 of FIG. 5, and thus they are not further detailed herein. In the present embodiment, the control unit 733 includes an integrator unit 7331, an error amplifier unit 7332, a conduction time control unit 7333, a zero current detection unit 7334, and a flip-flop unit 7335.

The integrator unit 7331 is electrically coupled to the current emulating unit 732 through a switch SW. The integrator circuit 7331 is configured to integrate the peak current and the valley current so as to obtain an emulated voltage. In one embodiment, the integrator unit 7331 includes a capacitor, but the present disclosure is not limited in this regard. In one embodiment, a turn-off period of the switch SW is substantially equal to a discharging period of a secondary winding N2 of the transformer 710.

A first terminal of the error amplifier unit 7332 is configured to receive a reference voltage $V_{ref}$. A second terminal of the error amplifier 7332 is electrically coupled to the integrator unit 7331, and is configured to receive the emulated voltage. The error amplifier unit 7332 is configured to compare the emulated voltage with the reference voltage $V_{ref}$ so as to generate an error signal. An output terminal of the error amplifier unit 7332 is configured to output the error signal.

A first terminal of the conduction time control unit 7333 is electrically coupled to the output terminal of the error amplifier unit 7332. An output terminal of the conduction time control unit 7333 is electrically coupled to a first terminal of the flip-flop unit 7335. The conduction time control unit 7333 is configured to generate a control signal according to the error signal.

A first terminal of the zero current detection unit 7334 is electrically coupled to an auxiliary winding N3 of the transformer 710. An output terminal of the zero current detection unit 7334 is electrically coupled to a second terminal of the flip-flop unit 7335. The zero current detection unit 7334 is configured to generate an enable signal according to a voltage $V_{N3}$ transient time of the auxiliary winding N3.

The first terminal of the flip-flop unit 7335 is configured to receive the control signal. The second terminal of the flip-flop unit 7335 is configured to receive the enable signal. The flip-flop unit 7335 is configured to determine whether to output the control signal to the power switch 720 according to the enable signal. In one embodiment, the flip-flop unit 7335 includes a RS flip-flop, but the present disclosure is not limited in this regard. In the present embodiment, the control signal is configured to control a conduction period of the power switch 720 so as to control the converter 700 to output a constant current.

Figure 8:
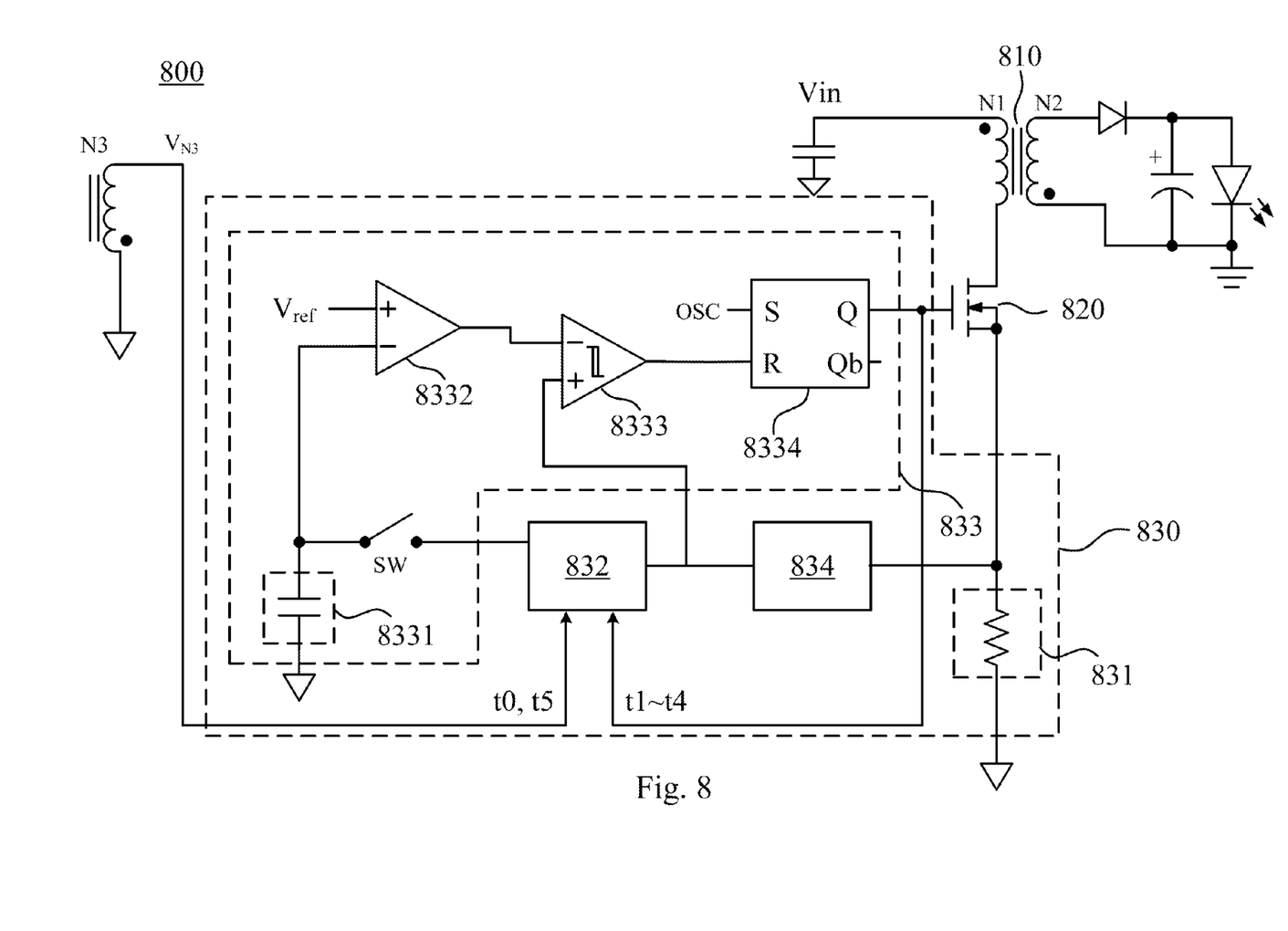
FIG. 8 depicts a schematic diagram of a converter according to a fourth embodiment of the present disclosure.

FIG. 8 depicts a schematic diagram of a converter 800 according to a fourth embodiment of the present disclosure. The converter 800 is adapted for driving an LED load. The converter 800 includes a transformer 810, a power switch 820, and a control circuit 830. The control circuit 830 includes a current sensing unit 831, a current emulating unit 832, a control unit 833, and a lead edge blanking unit 834. Operations and connections of the current sensing unit 831, the current emulating unit 832, the control unit 833, and the lead edge blanking unit 834 are similar to those of the current sensing unit 731, the current emulating unit 732, the control unit 733, and the lead edge blanking unit 734 of FIG. 7, and thus they are not further detailed herein. In the present embodiment, the control unit 833 includes an integrator unit 8331, an error amplifier unit 8332, a comparison unit 8333, and a flip-flop unit 8334. Operations and connections of the integrator unit 8331 and the error amplifier unit 8332 are similar to those of the integrator unit 7331 and the error amplifier unit 7332 of FIG. 7, and thus they are not further detailed herein.

A first terminal of the comparison unit 8333 is electrically coupled to an output terminal of the error amplifier unit 8332, and is configured to receive an error signal. A second terminal of the comparison unit 8333 is electrically coupled to the current sensing unit 831 through the lead edge blanking unit 834. Accordingly, the converter 800 can be operated in current mode, such that the converter 800 can achieve faster output response. The comparison unit 8333 is configured to compare a current signal sensed by the current sensing unit 831 with the error signal so as to generate the control signal. An output terminal of the comparison unit 8333 is configured to output the control signal.

A first terminal of the flip-flop unit 8334 is configured to receive an oscillation signal OSC. A second terminal of the flip-flop unit 8334 is electrically coupled to the output terminal of the comparison unit 8333. An output terminal of the flip-flop unit 8334 is electrically coupled to a control terminal of the power switch 820. The flip-flop unit 8334 is configured to determine to whether to output the control signal to the power switch 820 according to the oscillation signal. In one embodiment, the flip-flop unit 8334 includes a RS flip-flop, but the present disclosure is not limited in this regard. In the present embodiment, the control signal is configured to control a conduction period of the power switch 820 so as to control an input power of the converter 800 to be constant.

In this way, by calculating the actual valley current and the actual peak current with the current emulating unit 832, and by controlling the conduction period of the power switch 820 according to the control signal which is generated according to the valley current and the peak current with the control unit 833, a constant input power control of the converter 800 can be achieved.

Figure 9A:
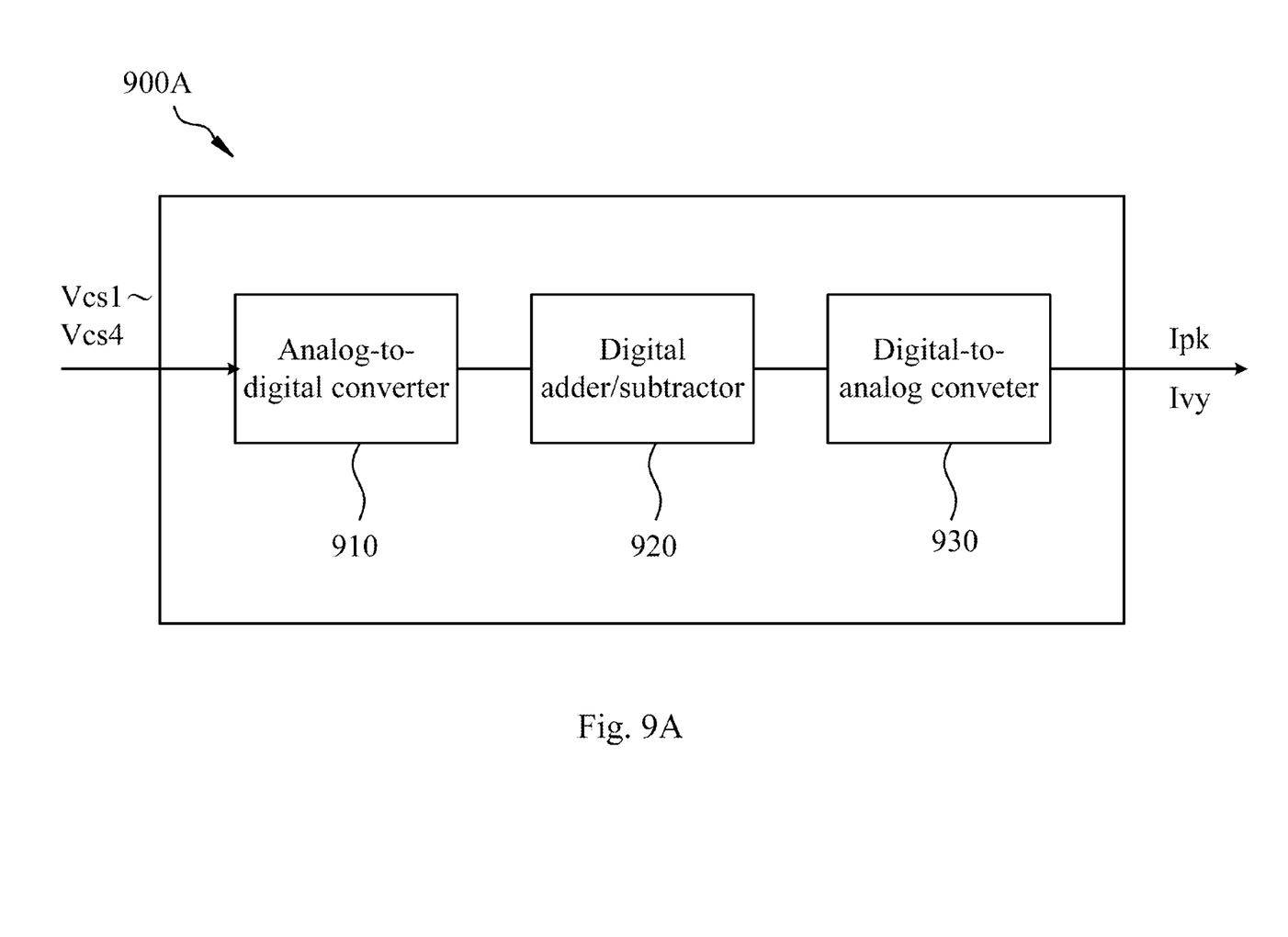
FIG. 9A depicts a schematic diagram of a current calculating circuit according to one embodiment of the present disclosure.

FIG. 9A depicts a schematic diagram of a current calculating circuit 900A according to one embodiment of the present disclosure. In the present embodiment, the current calculating circuit 900A can be implemented in digital form. As shown in FIG. 9A, the current calculating circuit 900 A includes an analog-to-digital converter 910, a digital adder/subtractor 920, and a digital-to-analog converter 930. An input terminal of the analog-to-digital converter 910 is configured to receive the sampling voltages Vcs1-Vcs4, to convert the sampling voltages Vcs1-Vcs4 into several digital codes, and to output the digital codes to the digital adder/subtractor 920. The digital adder/subtractor 920 is configured to receive and calculate the digital codes, to generate a digital signal, and to output the digital signal to the digital-to-analog converter 930. The digital-to-analog converter is configured to receive the digital signal, and to convert the digital signal into the peak current Ipk and the valley current Ivy.

Figure 9B:
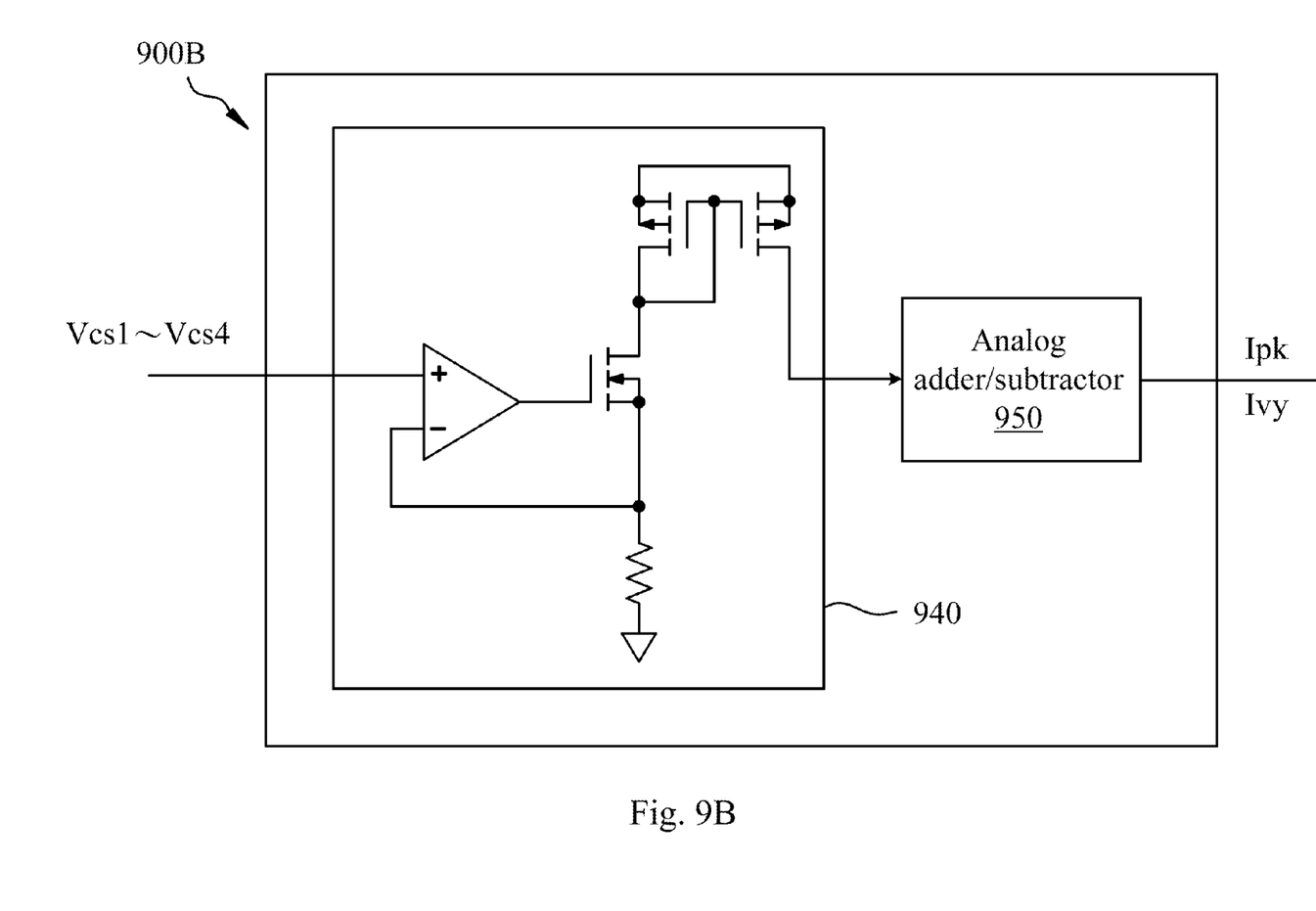
FIG. 9B depicts a schematic diagram of a current calculating circuit according to another embodiment of the present disclosure.

FIG. 9B depicts a schematic diagram of a current calculating circuit 900B according to another embodiment of the present disclosure. In the present embodiment, the current calculating circuit 900B can be implemented in analog form. As shown in FIG. 9B, the current calculating circuit 900B includes several current mirrors 940 and an analog adder/subtractor 950. In order to describe the current calculating circuit 900B conveniently, the number of the current mirror 940 is one in the present figure. The current mirror 940 is configured to receive the sampling voltages Vcs1-Vcs4, and to convert the sampling voltage Vcs1-Vcs4 into several sampling currents. The analog adder/subtractor 950 is configured to receive and calculate the sampling currents so as to obtain the peak current Ipk and the valley current Ivy.

To sum up, the present disclosure provides a control circuit, which can correct an error in an inductor current caused by a propagation delay period of the converter of the circuitry, such that line regulation of the circuitry is improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A control circuit for controlling an input power or an output current of a converter, wherein the converter comprises a transformer and a power switch, and the power switch is electrically coupled to a primary winding of the transformer, the control circuit comprising:

a current sensing unit electrically coupled to the power switch, the current sensing unit configured to sense a current flowing through the power switch, and to convert the current into a voltage;

a current emulating unit electrically coupled to an auxiliary winding of the transformer, the power switch, and the current sensing unit, the current emulating unit configured to determine a propagation delay period according to a voltage transient time of the auxiliary winding and a turn-off time of the power switch, to retrieve a plurality of sampling times in a conduction period of the power switch according to the propagation delay period, to obtain a plurality of sampling voltages at the sampling times by the current sensing unit, and to obtain a peak current and a valley current flowing through the power switch according to the sampling voltages;

a control unit configured to generate a control signal according to the peak current and the valley current, wherein the control signal is configured to control the power switch so as to control the input power or the output current of the converter, wherein the sampling times comprises a first sampling time, a second sampling time, and a third sampling time, wherein a time interval between the first sampling time and the second sampling time is substantially equal to the propagation delay period, and the third sampling time is the turn-off time of the power switch.

2. The control circuit of claim 1, wherein the current emulating unit is configured to subtract a first sampling voltage corresponding to the first sampling time from a sum of a second sampling voltage corresponding to the second sampling time and a third sampling voltage corresponding to the third sampling time so as to obtain a peak voltage corresponding to the peak current.

3. The control circuit of claim 1, wherein the sampling times further comprises a fourth sampling time, wherein a time interval between the fourth sampling time and the first sampling time is substantially equal to a time interval between the first sampling time and a conduction time of the power switch.

4. The control circuit of claim 3, wherein the current emulating unit is configured to subtract a fourth sampling voltage corresponding to the fourth sampling time from two times of the first sampling voltage so as to obtain a valley voltage correspond to the valley current.

5. The control circuit of claim 3, wherein the control circuit further comprises a lead edge blanking unit electrically coupled to the current sensing unit and the current emulating unit, the lead edge blanking unit is configured to delay the current emulating unit for a blanking period when the power switch is conducted.

6. The control circuit of claim 5, wherein the time interval between the fourth sampling time and the first sampling time, the time interval between the first sampling time and the conduction time of the power switch, and the blanking period are substantially the same.

7. The control circuit of claim 1, wherein the current emulating unit comprises:
  a sample and hold circuit configured to sample the sampling voltages at the sampling times; and
  a current calculating circuit configured to receive and calculate the sampling voltages so as to obtain the peak current and the valley current.

8. The control circuit of claim 7, wherein the current calculating circuit comprises:
  a current mirror configured to convert the sampling voltage into a plurality of sampling currents; and
  an analog adder/subtractor configured to calculate the sampling currents so as to obtain the peak current and the valley current.

9. The control circuit of claim 7, wherein the current calculating circuit comprises:
  an analog-to-digital converter configured to receive the sampling voltages, and to convert the sampling voltages into a plurality of digital codes;
  a digital adder/subtractor configured to receive and calculate the digital codes, and to generate a digital signal; and
  a digital-to-analog converter configured to receive the digital signal, and to convert the digital signal into the peak current and the valley current.

10. The control circuit of claim 1, wherein the control unit comprises:
  an integrator unit electrically coupled to the current emulating unit, the integrator circuit configured to integrate the peak current and the valley current so as to obtain an emulated voltage; and
  an error amplifier unit configured to compare the emulated voltage with a reference voltage so as to generate an error signal;
  wherein the control unit generates the control signal according to the error signal.

11. The control circuit of claim 10, wherein the control unit further comprises:
  a conduction time control unit electrically coupled to the error amplifier unit, the conduction time control unit configured to generate the control signal according to the error signal;
  a zero current detection unit electrically coupled to the auxiliary winding, the zero current detection unit is configured to generate an enable signal according to the voltage transient time of the auxiliary winding; and
  a flip-flop unit configured to determine whether to output the control signal to the power switch according to the enable signal.

12. The control circuit of claim 10, wherein the control unit further comprises:
  a comparison unit configured to compare a current signal sensed by the current sensing unit with the error signal so as to generate the control signal; and
  a flip-flop unit configured to determine to whether to output the control signal to the power switch according to an oscillation signal.

13. The control circuit of claim 1, the control unit comprises:
  an integrator unit electrically coupled to the current emulating unit, the integrator circuit configured to integrate the peak current and the valley current so as to obtain an emulated voltage; and
  a first error amplifier unit configured to compare the emulated voltage with a first reference voltage so as to generate a first error signal;
  a second error amplifier unit configured to compare a voltage of the auxiliary winding with a second reference voltage so as to generate a second error signal;
  a selection unit configured to output corresponding one of the first error signal and the second error signal;
  a comparison unit configured to compare a current signal sensed by the current sensing unit with the corresponding one of the first error signal and the second error signal so as to generate the control signal; and
  a flip-flop unit configured to determine to output the control signal to the power switch according to an oscillation signal.

* * * * *